(12) United States Patent
Watanabe

(10) Patent No.: US 9,324,187 B2
(45) Date of Patent: Apr. 26, 2016

(54) VISUALIZATION APPARATUS AND METHOD

(75) Inventor: Masahiro Watanabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 313 days.

(21) Appl. No.: 13/565,842

(22) Filed: Aug. 3, 2012

(65) Prior Publication Data

US 2013/0063425 A1    Mar. 14, 2013

(30) Foreign Application Priority Data

Sep. 14, 2011   (JP) .................................. 2011-201080

(51) Int. Cl.
*G06T 15/00* (2011.01)
*G06T 19/00* (2011.01)

(52) U.S. Cl.
CPC ...................... *G06T 19/00* (2013.01)

(58) Field of Classification Search
CPC . G06T 19/00; G06T 17/00; G06T 2219/2012; G06T 11/00; G06T 7/2086; G06T 7/602; G06T 11/001; G06T 2207/10024; G06T 7/2066; G06T 7/40; G06T 7/408; G06T 9/00; G06T 15/08; G06T 15/04; G06T 15/205; A61B 5/742; A61B 5/7425; A61B 6/461; A61B 6/466; A61N 2005/1074; G06F 19/3406; G06F 17/30256
USPC ......................................................... 345/419
See application file for complete search history.

(56) References Cited

U.S. PATENT DOCUMENTS

| | | | | |
|---|---|---|---|---|
| 6,226,006 | B1* | 5/2001 | Collodi | 345/426 |
| 6,775,403 | B1* | 8/2004 | Ban et al. | 382/154 |
| 2011/0285695 | A1* | 11/2011 | Rust | 345/419 |
| 2012/0229496 | A1* | 9/2012 | Bloemer | 345/593 |
| 2013/0038605 | A1* | 2/2013 | Li et al. | 345/419 |

FOREIGN PATENT DOCUMENTS

| | | | |
|---|---|---|---|
| DE | WO2009109205 A1 * | 9/2009 | ............ G06T 11/001 |
| JP | 2-197965 A | 8/1990 | |
| JP | 5-101150 A | 4/1993 | |
| JP | 5-224657 A | 9/1993 | |
| JP | 08-129579 | 5/1996 | |
| JP | 09-293146 | 11/1997 | |
| JP | 3047339 | 5/2000 | |

(Continued)

OTHER PUBLICATIONS

Kazuyuki et al., English Translation of IDS (JP3558231B), Aug. 2004, p. 1-24.*

(Continued)

*Primary Examiner* — Gregory J Tryder
*Assistant Examiner* — Yuehan Wang
(74) *Attorney, Agent, or Firm* — Fujitsu Patent Center

(57) ABSTRACT

A visualization process visualizes a visualization range of a three-dimensional model based on physical values of regions of the model. The visualization process may include setting the visualization range, projecting the physical values corresponding to the visualization range onto a visualization plane, designating a coloring range for the projected physical values within the visualization range based on the physical values, defining color information that determines a relationship of the physical values and colors based on the coloring range, and coloring the visualization range based on the color information and the coloring range.

18 Claims, 14 Drawing Sheets

VISUALIZATION RANGE

(56) References Cited

FOREIGN PATENT DOCUMENTS

| | | | | |
|---|---|---|---|---|
| JP | 2000-339486 A | 12/2000 | | |
| JP | 2003-91738 A | 3/2003 | | |
| JP | 2004-93632 A | 3/2004 | | |
| JP | 3558231 B | * | 8/2004 | ............ G06F 17/50 |
| JP | 2008-186309 A | 8/2008 | | |

OTHER PUBLICATIONS

Japanese Office Action mailed on Jun. 9, 2015 for corresponding Japanese Patent Application No. 2011-201080, with Partial English Translation, 4 pages.

Japanese Office Action mailed on Mar. 17, 2015 for corresponding Japanese Patent Application No. 2011-201080, with Partial English Translation, 4 pages.

* cited by examiner

VISUALIZATION RANGE

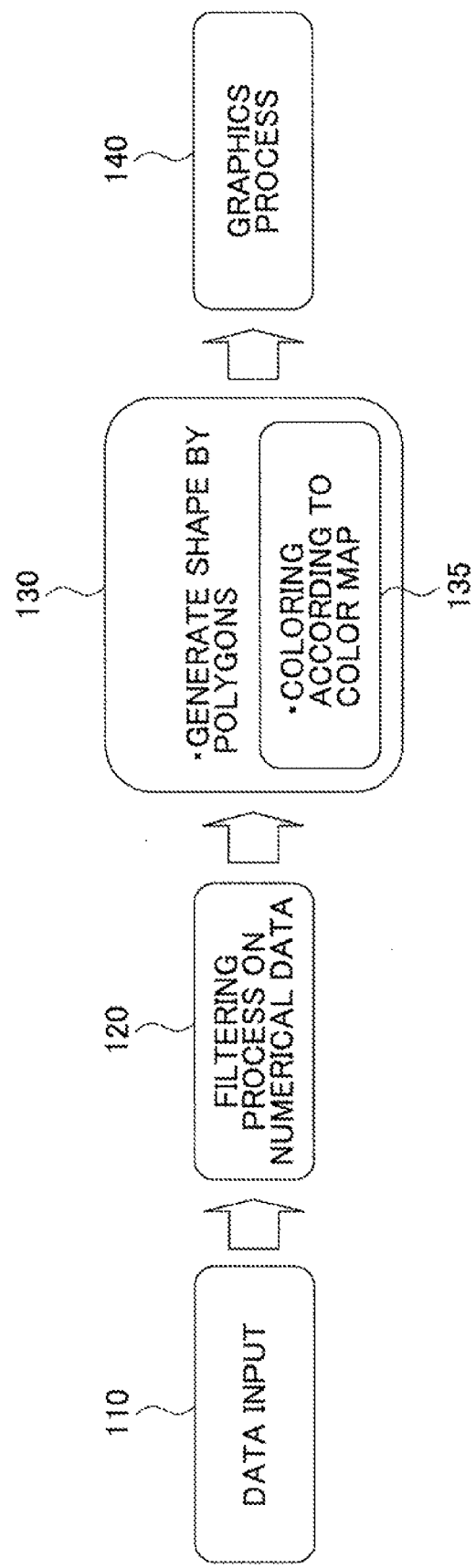

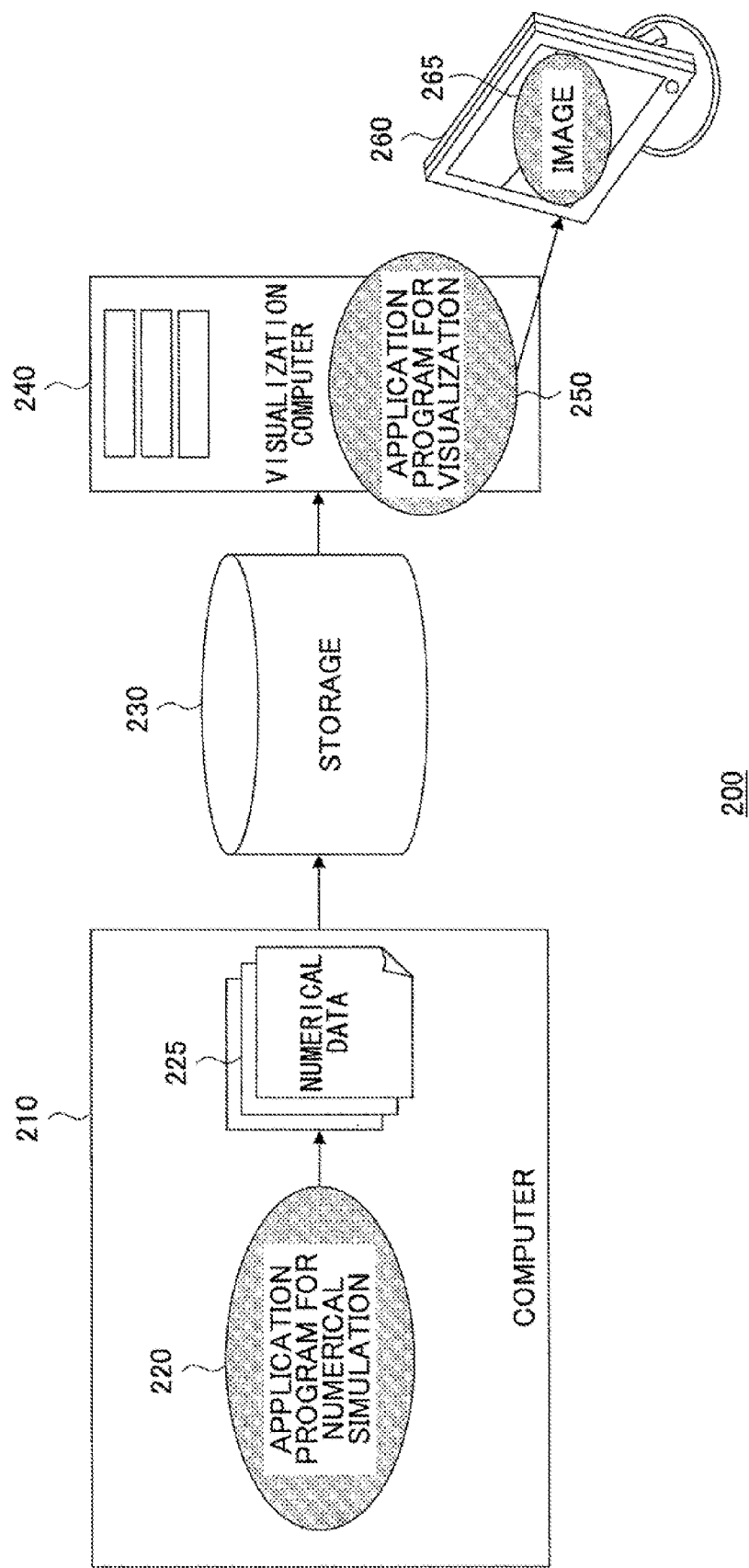

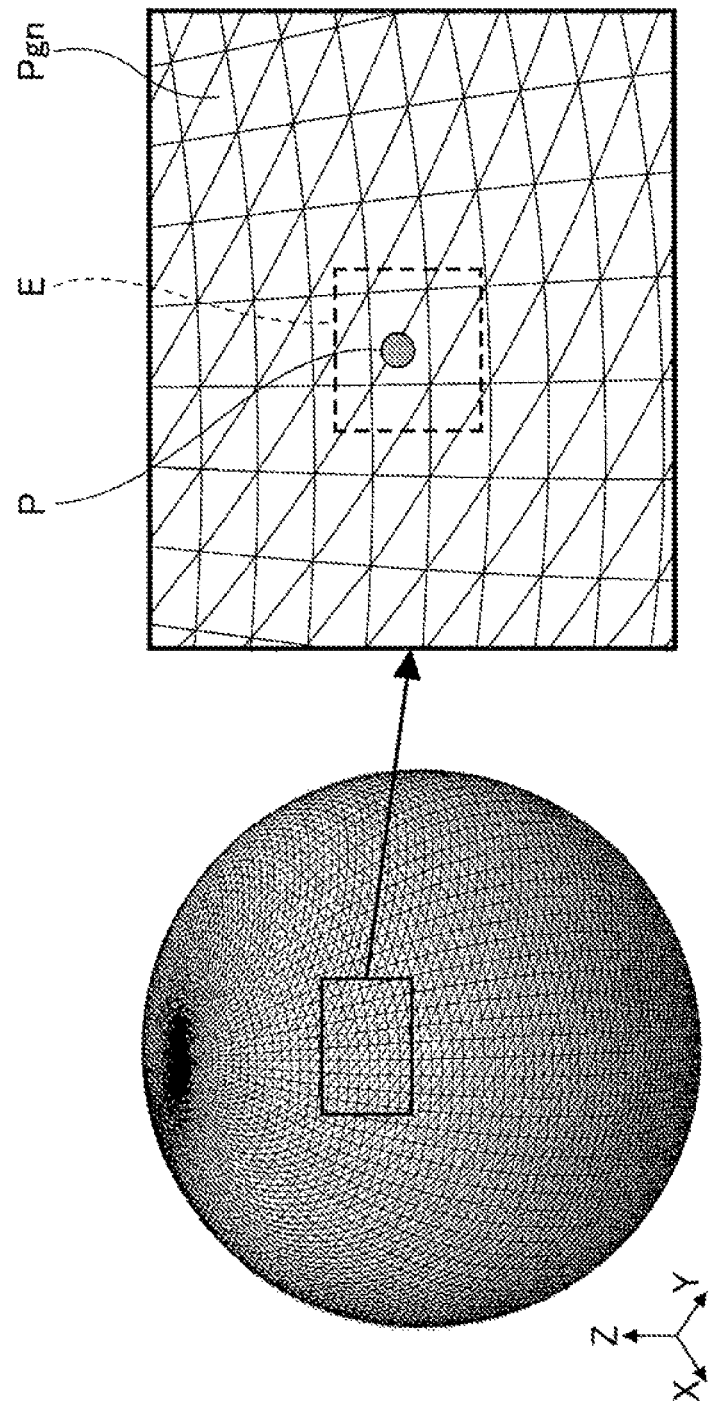

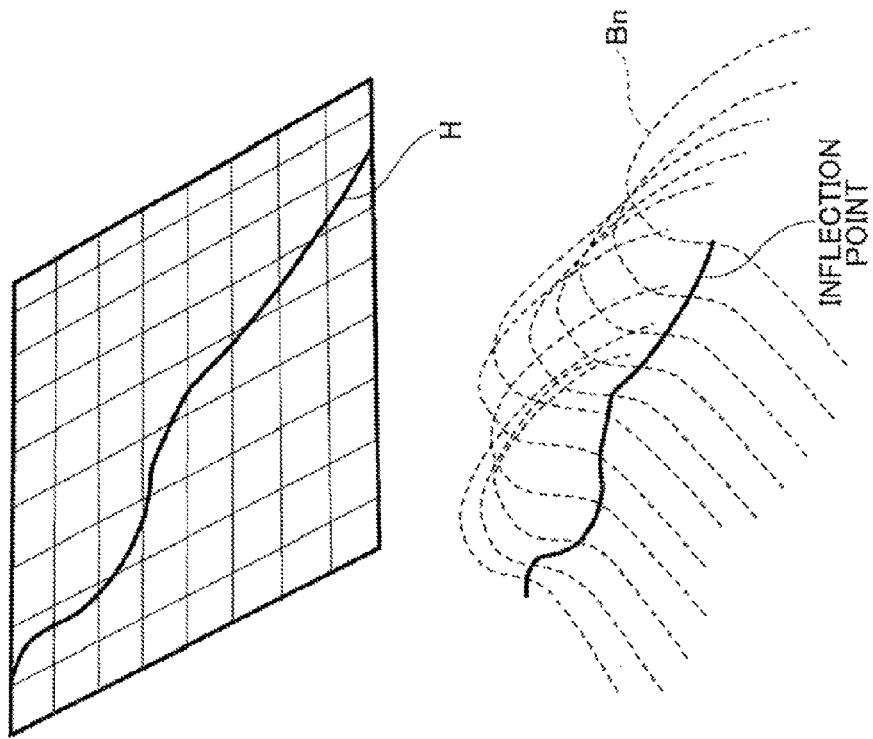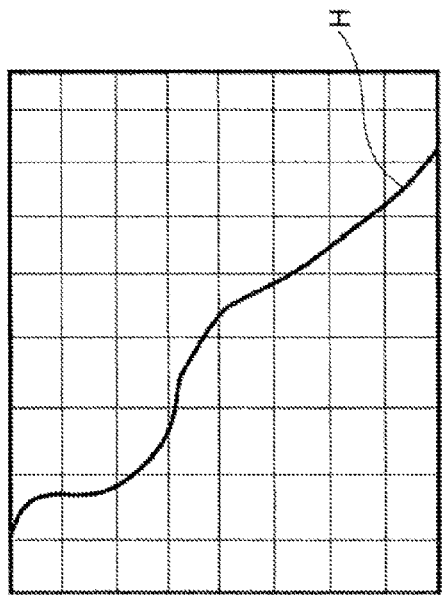

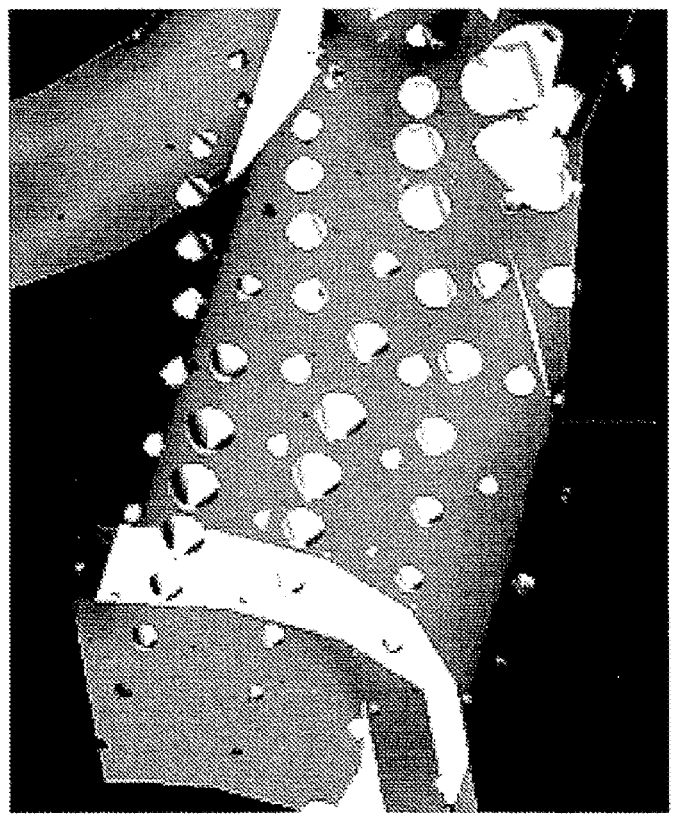
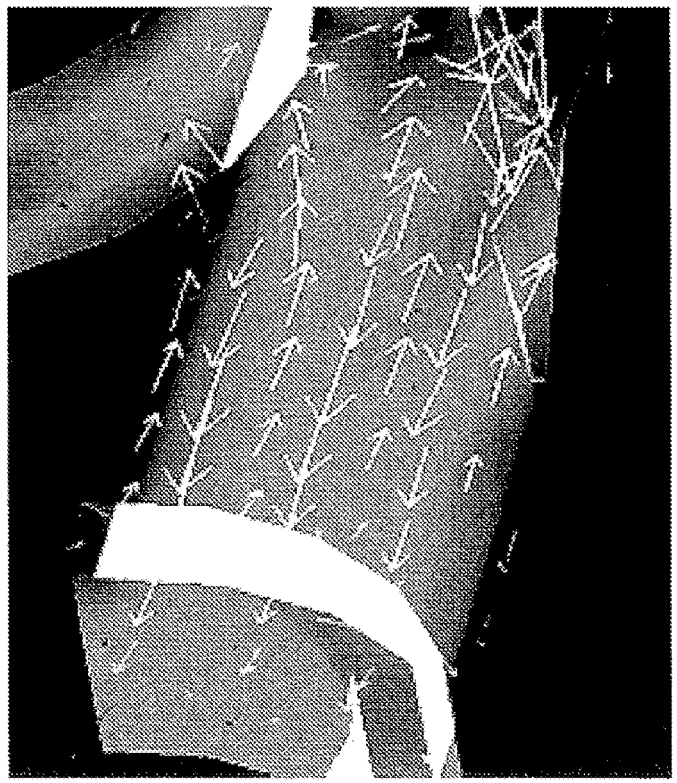
FIG.12B
FIG.12A

VISUALIZATION APPARATUS AND METHOD

CROSS-REFERENCE TO RELATED APPLICATIONS

This application is based upon and claims the benefit of priority of the prior Japanese Patent Application No. 2011-201080, filed on Sep. 14, 2011, the entire contents of which are incorporated herein by reference.

FIELD

The embodiments discussed herein are related to a visualization apparatus, a visualization method, and a computer-readable storage medium having stored therein a program for causing a computer to execute a visualization process.

BACKGROUND

Recently, computer simulation is utilized in various fields. Due to the increase in the scale and computation speed of the computer simulation, the amount of data to be processed by the computer simulation is increasing with improvements in the processing capacity of the computers. Particularly in the field of HPC (High Performance Computing), there is a considerable increase in the amount of data to be processed. Recent simulations utilize a large number of polygons in order to represent an atomic structure in the case of a nano-device simulation, a shape of an organ in the case of a bio-medical or biomechanical simulation. In addition, discrete data visualized in the simulation may include scalar values of stress, vorticity and the like in space, vector values of velocity, principal stress and the like, space data of tensor values output by shear stress or MRI (Magnetic Resonance Imaging), and the like. In general, such discrete data are displayed by abstraction in the form of three-dimensional shapes, and an extremely large number of three-dimensional shapes are generated in space.

Due to the considerably large amount of data output by the recent simulations, the data unit may be on the order of terabytes (TB) to petabytes (PB), which in turn considerably increases the number of polygons to be displayed and considerably increases the time it takes for the visualization process to be performed.

Color mapping may be made on the three-dimensional shape, in order to provide a clearer representation of the three-dimensional shape. A user may decide parameters (or physical values) to which the color mapping is to be made. The physical values may related to stress, velocity, temperature, and the like. A color map defines the mapping of the physical values and the colors.

The development of visualization techniques and systems that may cope with the large-scale data is in progress. However, one of the most troublesome and time-consuming operations to be performed by the user during the visualization process is the setting of the color map described above. The visualization process replaces the physical value distribution designated by the user by colors according to the color map, on the polygons, and performs a computer graphics process in order to facilitate observation (or monitoring) of a phenomenon of the simulation target. In order to set the color map according to the data that change with time or according to micro-phenomenon to be observed, a troublesome and time-consuming process may be required to repeatedly set a suitable color map while observing the physical value distribution of the observation target.

FIGS. 1A, 1B, and 1C are diagrams for explaining a color map adjustment with respect to a partially enlarged image. FIG. 1A illustrates the entire image. The user designates a visualization range with respect to the entire image, by a white rectangular frame illustrated in FIG. 1A. The visualization range may be designated by a pointing device such as a mouse, a tablet, and the like. Alternatively, the visualization range may be designated by use of a simulation camera, by determining a camera position, a lens focal distance, a lens direction, and the like.

FIG. 1B illustrates an image that is obtained by rendering the visualization range using the color map applied to the entire image illustrated in FIG. 1A. In this example, approximately 80% of the screen is formed by an image having a color tone close to black. It may be seen from FIG. 1B that the rendering of the visualization range designated by the user is not appropriate.

On the other hand, FIG. 1C illustrates an example of the image that is obtained by manually adjusting the color map. The color map is appropriately adjusted by the user and set in order to enable satisfactory observation of the phenomenon in the visualization range. A black-and-white image is illustrated in FIG. 1C, however, the actual image is in color and is easily recognizable by the user due to the color mapping. The manual adjustment of the color map by the user includes setting the color map, rendering the visualization range, and repeating the setting and rendering in order to more clearly visualize the phenomenon in the visualization range by the rendering. In other words, the setting and rendering are repeated several times in a trial-and-error manner. Consequently, the color map adjustment may take time to perform.

FIG. 2 is a flow chart for explaining an example of the visualization process. In FIG. 2, a step 110 inputs numerical data to a processing unit (or computer) by a data input process. A step 120 performs a filtering process on the numerical data, when required as a pre-process. The filtering process may include a process to select a target data range. In this state, target physical values of the color display are selected. Next, a step 130 generates shapes, that is, polygons, by a visualization technique. A step 135 replaces the physical values of the visualization target (shape or polygon) into colors according to the color map. A step 140 inputs the shapes and colors, and performs a graphics process, such as a rendering process, on the input shapes and colors.

In order to reset the color map, the process needs to return to the filtering process of the step 120. Further, after the process of the step 130, the data integrally includes the color data and the shape data, and the color map adjustment of FIG. 1C is not possible after the step 130. For this reason, the process needs to return to the data input process of the step 110 in order to reexecute the data input process, and the color map adjustment after the step 130 may take time to perform.

In an example of a known visualization apparatus that visualizes the numerical data of a numerical simulation result, a luminance computing unit may obtain the numerical data with respect to each pixel by interpolating the numerical data supplied from a numerical data storage unit. A color corresponding to the numerical data may be obtained from a table storing a correspondence of the data values and the colors. The luminance of the pixel may be computed by combining the color obtained from the table and the intensity of light irradiated on a position where the pixel is to be displayed.

On the other hand, in an example of a known simulation system to display a response of a framed structure, arbitrary points may be designated by a time sequential point designating unit, such as a mouse. Each node of the designated time sequential points and a physical quantity level of each element or each surface element may be displayed in colors according to each node corresponding to the framed structure displayed on a display unit and the physical quantity level of each element or each surface element of the framed structure.

In addition, in an example of a known visualization process, a state of an analyzing target may be computed, and pixel data indicating the state of the analyzing target as an image may be generated from the computation result on the analyzing target, based on preset parameters for visualization. Z-buffer values, or depth data of the pixel data from a predetermined viewpoint may also be generated. The pixel data and the Z-buffer values may be combined to generate pixel data of one frame that is displayed.

Examples of prior art may include a Japanese Patent No. 3047339 (or Japanese Laid-Open Patent Publication No. 6-231277), a Japanese Laid-Open Patent Application Publication No. 8-129579, and a Japanese Laid-Open Patent Publication No. 9-293146.

SUMMARY

Accordingly, it is an object in one aspect of the embodiment to provide a visualization apparatus, a visualization method, and a computer-readable storage medium, that may automatically determine a color map to clearly display a visualization range from data of the visualization range, in a visualization process with respect to simulation data.

According to one aspect of the present invention, a visualization apparatus may include a processing unit configured to visualize a visualization range of a three-dimensional model, based on physical values of a plurality of regions of the model, wherein the processing unit may perform a visualization process that includes setting the visualization range; projecting the physical values of the plurality of regions of the model corresponding to the set visualization range onto a visualization plane that is a display target; designating a coloring range for the physical values of the plurality of regions of the model projected onto the visualization plane, within the set visualization range, based on the physical values; defining color information that determines a relationship of the physical values and colors, based on the coloring range of the physical values; and coloring the visualization range, based on the defined color information and the designated coloring range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flow chart for explaining an example of a visualization process;

FIG. 3 is a diagram for explaining a system to perform the visualization process;

FIGS. 5A and 5B are diagrams for explaining an example of designating a visualization range;

FIGS. 9A and 9B are diagrams for explaining an inflection point curve of the physical values on the visualization plane;

FIGS. 12A and 12B are diagrams illustrating examples of applying the color map to vector data;

DESCRIPTION OF EMBODIMENTS

Figure 1B:
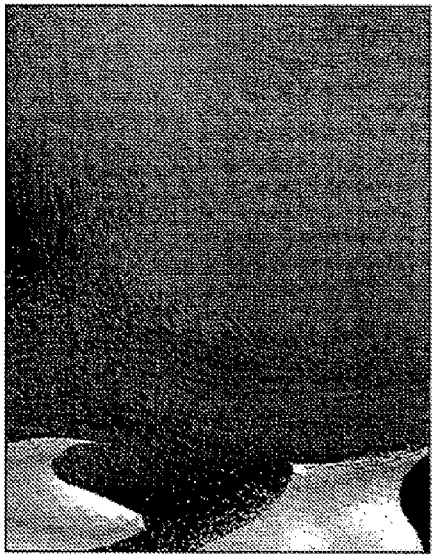
FIGS. 1A, 1B, and 1C are diagrams for explaining a color map adjustment with respect to a partially enlarged image.
Figure 1C:
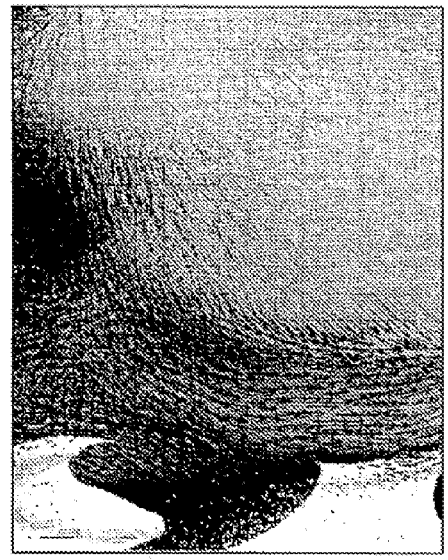
Figure 1A:
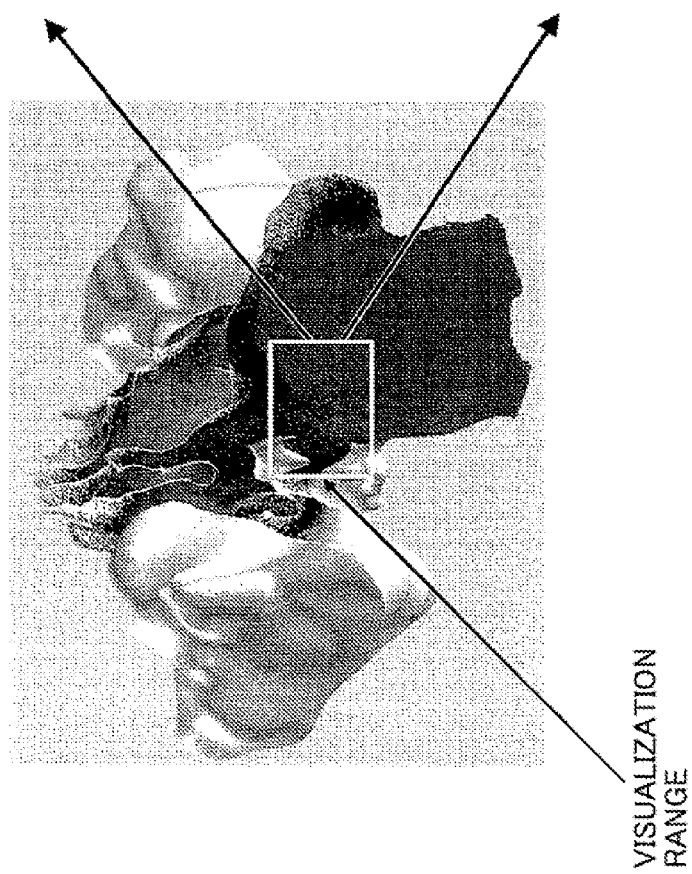

Preferred embodiments of the present invention will be described with reference to the accompanying drawings.

A description will now be given of the visualization apparatus, the visualization method, and the computer-readable storage medium in each embodiment according to the present invention.

FIG. 3 is a diagram for explaining a system to perform the visualization process. In a system 200 illustrated in FIG. 3, a computer 210 may execute an application program 220 to perform a numerical simulation, for example. Examples of the numerical simulation may include, but are not limited to, simulations of fluid flow, behavior of a part in response to a bending stress, and the like. In this embodiment, simulation targets of the numerical simulation by the computer 210 may include data acquired from actual physical phenomena, in addition to the numerical data. For example, the numerical simulation may be utilized for the visualization of the data acquired from the actual physical phenomena, such as measured data of organs of a patient acquired by MRI.

Numerical data 225 are acquired as a result of executing the application program 220 in the computer 210. The numerical data 225 may temporarily be stored in a storage 230. The storage 230 may be provided in a file server (not illustrated). An application program 250 for visualization may be installed in a visualization computer 240. The application program 250 may execute various processes of this embodiment to be described later. A display unit 260 may display an image 265 that is finally obtained by a rendering of the visualization performed when the visualization computer 240 executes the application program 250.

Figure 4:
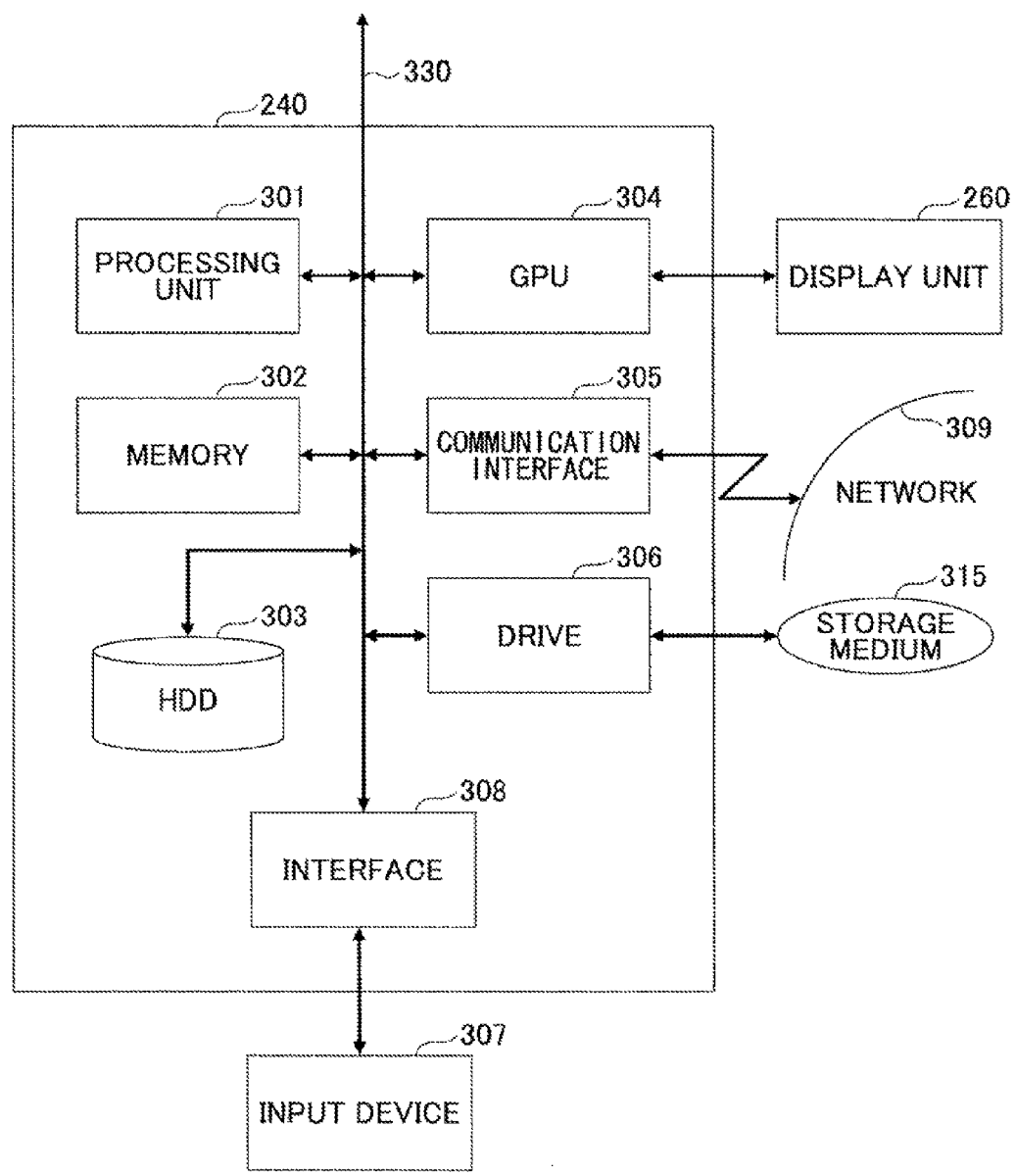
FIG. 4 is a block diagram illustrating an example of a hardware structure of a visualization computer.

FIG. 4 is a block diagram illustrating an example of a hardware structure of the visualization computer. The visualization computer 240 illustrated in FIG. 4 is an example of a visualization apparatus. The visualization computer 240 includes a processing unit 301, a memory 302, a HDD (Hard Disk Drive) 303, a GPU (Graphics Processing Unit) 304, a communication interface 305, a drive 306, and an interface 308 that are connected via a bus 330. The processing unit 301 may be formed by a CPU (Central Processing Unit) and the like, and execute programs including the application program 250. The memory 302 and the HDD 303 are examples of a storage unit to store various data and programs to be executed by the processing unit 301 or the GPU 304. The GPU 304 performs a process related to the rendering of a three-dimensional model. The GPU 304 may be omitted when the processing unit 301 executes the process related to the rending of the three-dimensional model. The image obtained by the rendering process performed by the GPU 304 (or the processing unit 301) may be displayed on a screen of the display unit 260. The communication interface 305 may communicate with an external apparatus (not illustrated) via a network 309. The network 309 is a wireless network in this example, however, the network 309 may be a cable network, or a combination of cable and wireless networks. A storage medium 315 may be loaded to and unloaded from the drive 306. The storage medium 315 may store various data and programs, and the drive 306 may read data and programs from and write data and programs to the storage medium 315 that is loaded to the drive 306. The storage medium 315 that is loaded to the drive 306 is another example of the storage unit to store various data and programs to be executed by the processing unit 301 or the GPU 304. The interface 308 provides an interface between the visualization computer 240 and an input device 307, such as a keyboard, a mouse, and the like.

The application program 250, when executed by the processing unit 301, may cause the visualization computer 240 to perform the visualization process. The application program 250 and other programs may be stored in a tangible or non-transitory computer-readable storage medium. The computer-readable storage medium may be formed by magnetic recording media, optical recording media, magneto-optical recording media, and semiconductor memory devices. The magnetic recording media may include magnetic disks, flexible disks, magnetic tapes, and the like. The optical recording media may include optical disks such as a DVD (Digital Versatile Disk), a DVD-RAM (DVD-Random Access Memory), a CD-ROM (Compact Disk-Read Only Memory), a CD-RW (Compact Disk-Recordable/Rewritable), and the like. The magneto-optical recording media may include MO (Magneto-Optical) disks, and the like. The semiconductor memory devices may include nonvolatile memories, and the like.

FIGS. 5A and 5B are diagrams for explaining an example of designating a visualization range. FIG. 5A illustrates the entire image of the simulation result. A process of rendering a model in the three-dimensional space onto a two-dimensional plane according to the simulation result may be realized by various techniques known to those skilled in the art. FIG. 5A illustrates a state in which the user designates the visualization range of interest by surrounding the visualization range by a rectangular frame using the pointing device such as the mouse.

FIG. 5B illustrates an enlarged image of the visualization designated by the user. In many cases, the user may wish to observe in detail a region of interest from the entire image of the simulation result. In such a case, there is no guarantee that the color map applied to the entire image illustrated in FIG. 5A is appropriate for the visualization range illustrated in FIG. 5B. For this reason, the user may apply a more appropriate color map for the visualization range, different from the color map applied to the entire image, when preferred. The model illustrated in FIG. 5B is formed by a plurality of triangular polygons Pgn. However, the model of the three-dimensional shape may of course be formed by techniques other than the technique that uses polygons. In addition, the triangular polygons Pgn are used in many cases in order to simplify the computation process, however, the polygons are of course not limited to triangular polygons and polygons having shapes other than triangular shapes may be used when preferable.

The user may additionally designate a fixation point P and a fixation range E. The fixation point P and the fixation range E may indicate a point and a range of particular interest to the user within the visualization range designated by the user. For example, features of physical values (or physical constants) close to the fixation point P may be treated with a priority over features of other physical values farther away from the fixation point P, as will be described later. Further, features of physical values falling within the fixation range E may be treated with a priority over features of physical values at other locations outside the fixation range E, as will be described later. The operation of additionally designating the fixation point P and the fixation range E may be omitted, when preferred. In addition, a center position within the visualization range may be designated as the fixation point P by a default setting. Similarly, a central region within the visualization range may be designated as the fixation range E by a default setting.

Figure 6B:
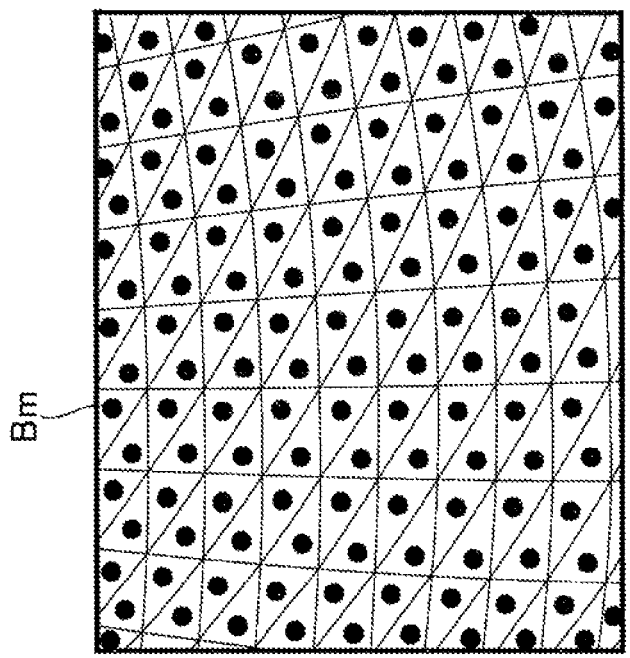
FIGS. 6A and 6B are diagrams for explaining an example of extracting physical values from the visualization range onto a visualization plane.
Figure 6A:
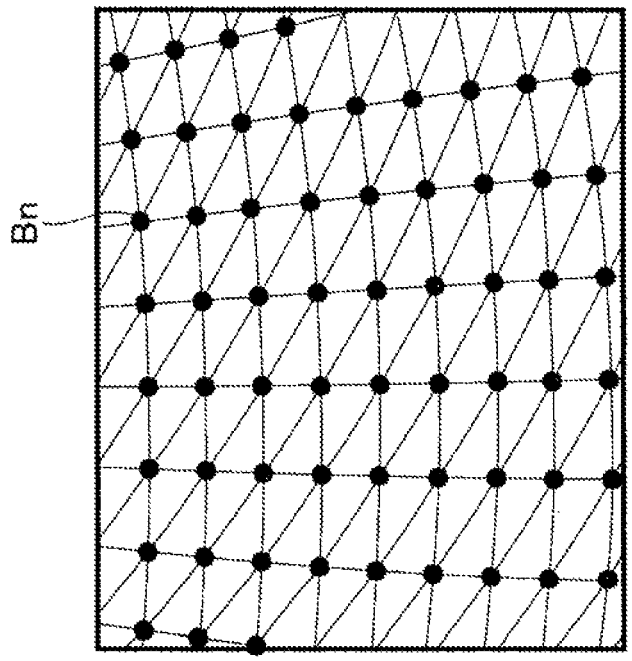

FIGS. 6A and 6B are diagrams for explaining an example of extracting physical values from the visualization range onto a visualization plane. The visualization plane is a plane on which the visualization range is mapped. Each of FIGS. 6A and 6B illustrates an example of extracting the physical values at respective positions on the three-dimensional model. As will be described later, the physical values are extracted in order to extract features of the physical values on the visualization screen. By performing the operation of extracting the physical values onto the visualization plane, the physical values related to the visualization range for display on the screen may become processing targets of a post-process, in order to simplify the computation process.

The polygons Pgn that are processing targets of the series of processes described above may be located on the surface of the target model. Hence, prior to performing the series of processes described above, the polygon Pgn located nearest to the viewpoint (or located closest when viewed from the viewpoint) may be set as the processing target, based on a positional relationship between the viewpoint and the polygons Pgn. The polygon Pgn located nearest to the viewpoint may be detected by searching the polygons Pgn according to a known technique that uses the Z-buffer, for example.

FIG. 6A illustrates an example in which the physical values at the nodes of the polygons Pgn are extracted, by focusing on the nodes. For example, the physical values corresponding to the positions nodes Bn are extracted.

FIG. 6B illustrates an example in which the physical values at centers of gravity of the polygons Pgn are extracted. For example, the physical values at centers of gravity, bm, of the polygons Pgn are extracted.

The physical values of the finite number of simulation data actually stored as the computation result exist discretely in the three-dimensional space. Hence, it is not always the case that the physical values exist at each of the positions indicated by black circular marks in FIGS. 6A and 6B. With respect to the position, indicated by the black circular mark, where the physical values do not exist, the physical values thereof may be interpolated from the physical values existing at neighboring positions, indicated by the black circular marks, where the physical values do exist.

Figure 7:
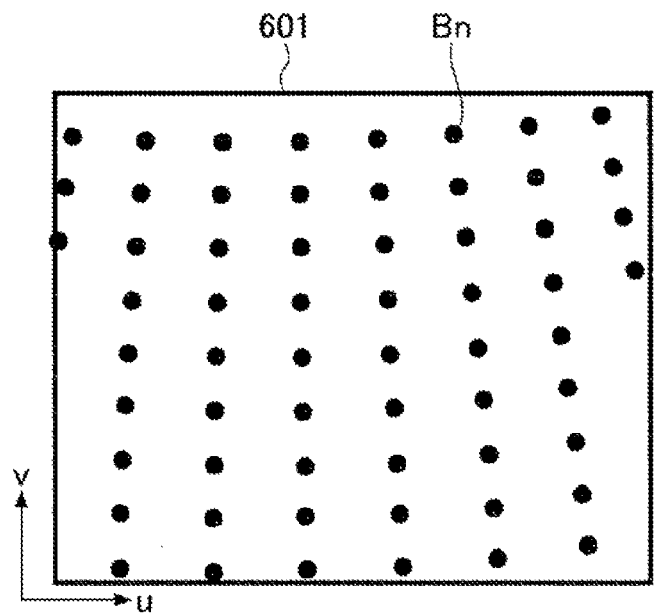
FIG. 7 is a diagram illustrating an example of a projection of the physical values on the visualization plane.

FIG. 7 is a diagram illustrating an example of a projection of the physical values on the visualization plane. A frame 601 illustrated in FIG. 7 corresponds to the visualization plane. For example, the physical values are projected onto positions Bn. For the sake of convenience, rectangular coordinates (u, v) may be defined on the visualization plane for use in computations to be described later. As illustrated in FIG. 7, the positions of the projected physical values are not arranged equidistant from each other on the visualization plane, and are distorted in a spherical shape.

Figure 8:
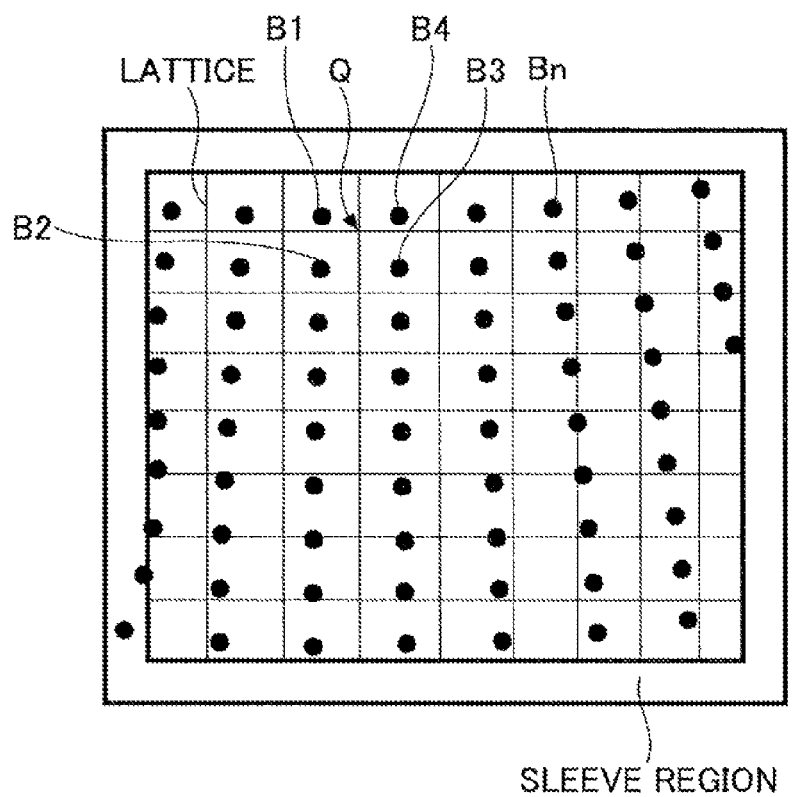
FIG. 8 is a diagram for explaining an example of allocating the physical values by an interpolation to lattice points of a structural lattice on the visualization plane.

FIG. 8 is a diagram for explaining an example of allocating the physical values by an interpolation to lattice points of a structural lattice on the visualization plane. More particularly, FIG. 8 illustrates a process of providing equidistant virtual lattices perpendicular to the visualization plane, performing an interpolation (or interpolation operation) based on the physical values extracted in FIG. 6A or FIG. 6B and the positions on the visualization plane, and allocating the interpolated physical values (or interpolated values) to the positions of each of the lattice points. For example, when no physical value is allocated to a lattice point Q, a linear interpolation (or interpolation operation) may be performed based on the physical values and the positions of four points B1 through B4 neighboring the lattice point Q, and the position of the lattice point Q. The result of the linear interpolation (that is, interpolated values) may be allocated to the lattice point Q as the physical values. A sleeve region may be provided in order to eliminate an interpolation error of the interpolation with respect to the physical values at each of the lattice points located at end positions on the visualization plane. According to the process described above, the physical values are allocated to each of the lattice points that are arranged equidistant from each other on the visualization plane, and the subsequent computation process may be facilitated. Of course, the subsequent computation process may be performed without providing the lattice points.

FIGS. 9A and 9B are diagrams for explaining an inflection point curve of the physical values on the visualization plane. An inflection point of the physical value refers to a point that becomes zero when a second order differential of the physical value is obtained. Because the physical values are spread two-dimensionally on the visualization plane, a spatial second order differential of the physical value may be obtained. An inflection point curve H refers to a curve connecting the inflection points. FIG. 9B is a schematic of the inflection point curve H illustrated in FIG. 9A. A lower half of FIG. 9B schematically represents the values of the physical values as heights. When the values of the physical values are represented as the heights, a transition point from a convex surface to a concave surface (or vice versa) corresponds to the inflection point. The curve connecting the transition points illustrated in the lower half of FIG. 9B is projected onto the visualization plane and illustrated as the inflection point curve H in an upper half of FIG. 9B. The inflection point curve H may be regarded as a characteristic part of the physical values where the physical values greatly change. Hence, the inflection point curve H may be regarded as forming an interface with respect to the physical values. Although the inflection point curve H represents the characteristic part or position of the physical values, the characteristic part or position of the physical values is difficult to recognize from the colors according to the conventional color map. In addition, the moving of the inflection point curve H with time on the visualization plane is also difficult to recognize from the colors according to the conventional color map. The characteristic part or position of the physical values and the moving of the inflection point curve H with time on the visualization plane are difficult to recognize from the colors according to the conventional color map, because the conventional color map requires the user to manually set the color map in a trial-and-error manner.

Figure 10:
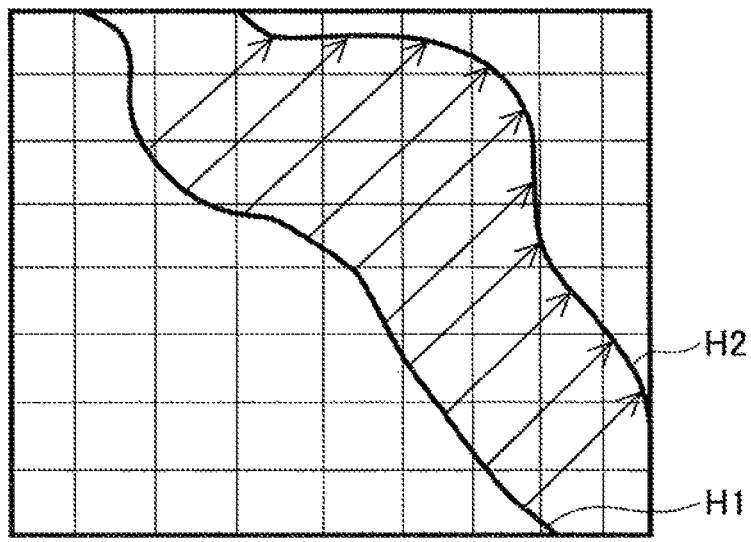
FIG. 10 is a diagram illustrating moving of the inflection point curve with time.

FIG. 10 is a diagram illustrating moving of the inflection point curve with time. FIG. 10 illustrates a case in which an inflection point curve H1 existing at a time t1 moves to a position H2 at a time t2. An index may be added to the inflection point curve and managed in order to track the moving of the inflection point curve. In addition, a new index may be added to a new inflection point curve when the new inflection point curve is generated. The inflection point curve may be formed a closed curve (or loop). A plurality of inflection point curves may exist. The coloring may be clarified (that is, made clearer) before or after the physical value having the inflection point curve.

Figure 11:
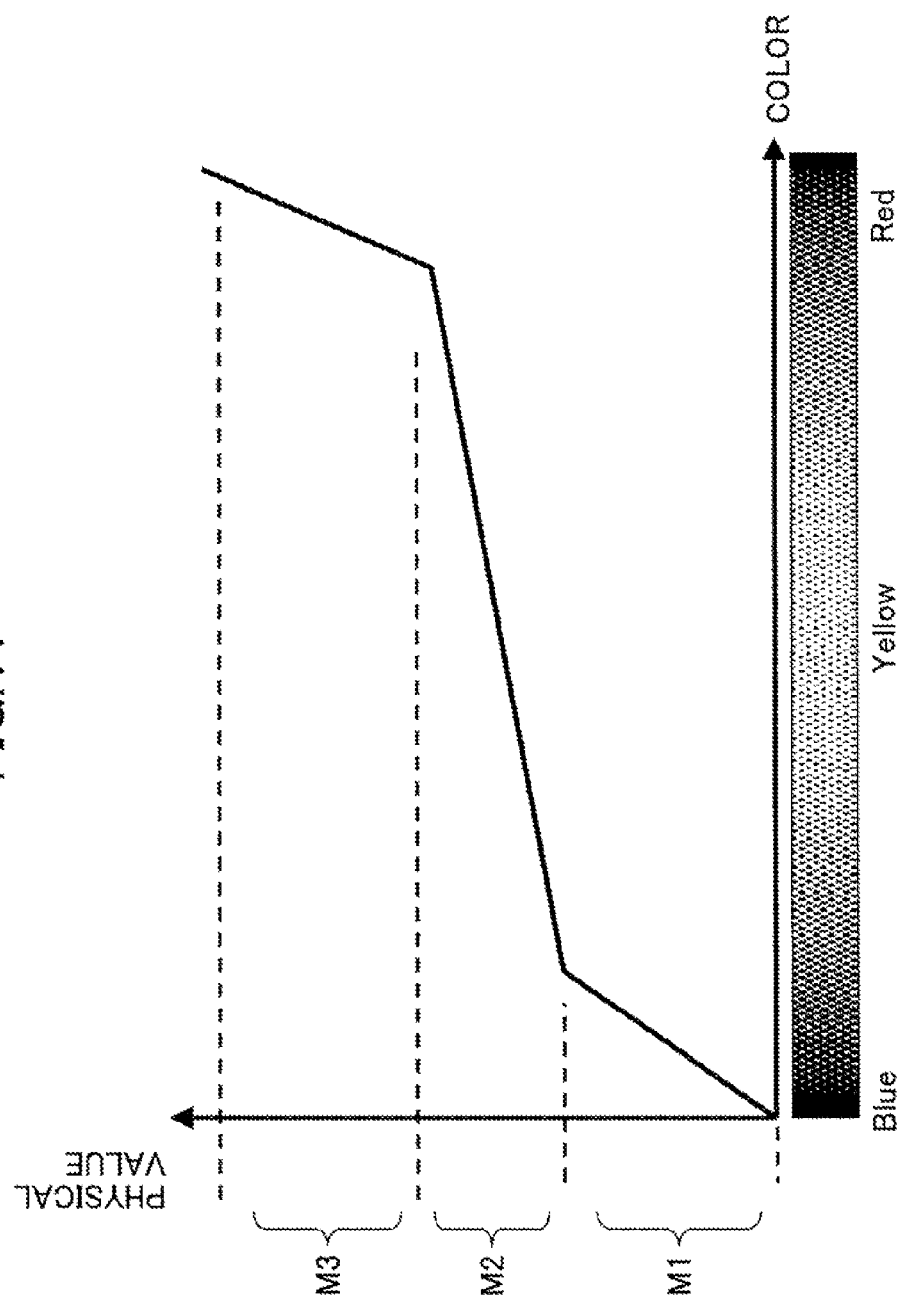
FIG. 11 is a diagram illustrating an example of a color map.

FIG. 11 is a diagram illustrating an example of the color map. Generally, the color map defines the mapping for the coloring, by making specific colors correspond to specific values of the physical values (or parameters). Hence, the color map may have an arbitrary format as long as the mapping may be defined. The format of the color map may include, but is not limited to, graph format, table format, function format, and the like. FIG. 11 illustrates the color map having the graph format (or graph representation). In the example illustrated in FIG. 11, a variety of more colors are allocated to a range M2 of the physical values than to other ranges M1 and M3, in order to perform the coloring. Accordingly, when the physical value falls within the range M2, a slight change in this physical value may be represented as a large change in color.

As an example, a case will be considered in which the physical values of the inflection point curve H1 illustrated in FIG. 10 fall within the range M2 illustrated in FIG. 11. In this case, when the characteristic part or position of the inflection point curve H1 illustrated in FIG. 10 is recognized and the color map illustrated in FIG. 11 is set based on the characteristic part or position, a color map that may appropriately represent the characteristic part or position of the physical values on the visualization plane may be defined automatically. The example described above performs the mapping of the wide range of colors with respect to the physical quantity to be emphasized. However, the mapping for the coloring may be performed selectively on the colors conspicuous to the human eye, such as red, for example. Alternatively, instead of using the color map, the mapping for the coloring may use a monochrome gradation map, such as a gray scale and the like.

According to the embodiment described above, the coloring may be performed by setting an appropriate color map, without losing the characteristics (that is, characteristic part or position) of the physical values.

In the embodiment described above, it is a precondition that the inflection point of the physical value, that becomes zero when the second order differential of the physical value is obtained, exists. However, there may exist cases in which the second order differential of the physical value does not become zero. In such cases, an increasing rate or a decreasing rate of the physical values within the visualization plane does not cross zero. Hence, in such cases, the physical values that take a maximum value and a minimum value on the visualization plane may be extracted, and the color map may be set so that the coloring of the model is performed between the maximum value and the minimum value. On the other hand, a region in which a gradient of the physical values is large, the phenomenon may be difficult to recognize. In this case, a position where the gradient of the physical values becomes a maximum and a direction of the gradient may be designated, and the coloring may be performed by mapping the colors in a wide range, such as the range M2 illustrated in FIG. 11, in between the maximum value and the minimum value of the physical values along the designated direction.

FIGS. 12A and 12B are diagrams illustrating examples of applying the color map to vector data. In the example described above, the color mapping is performed on the surface of the model. In FIG. 12A, the color mapping is performed with respect to a vector representation using arrows. The color mapping described above may be applied when performing the color mapping with respect to the vector data. Because the vector has a length, a starting position of the vector may be projected onto the visualization plane. The user may designate the physical value of the vector that is the target of the color mapping. On the other hand, in FIG. 12B which uses a representation format different from that of FIG. 12A, the color mapping is performed with respect to a vector representation using parasol-shaped polygons in place of the arrows. In this case, the positions of stems of the parasol-shaped polygons may be projected onto the visualization plane, for example. The setting of the color map to be applied to the parasol-shaped polygons may be performed in a manner similar to that described above. Alternatively, instead of using the color map, the mapping for the coloring may use a monochrome gradation map, such as a gray scale and the like.

Figure 13:
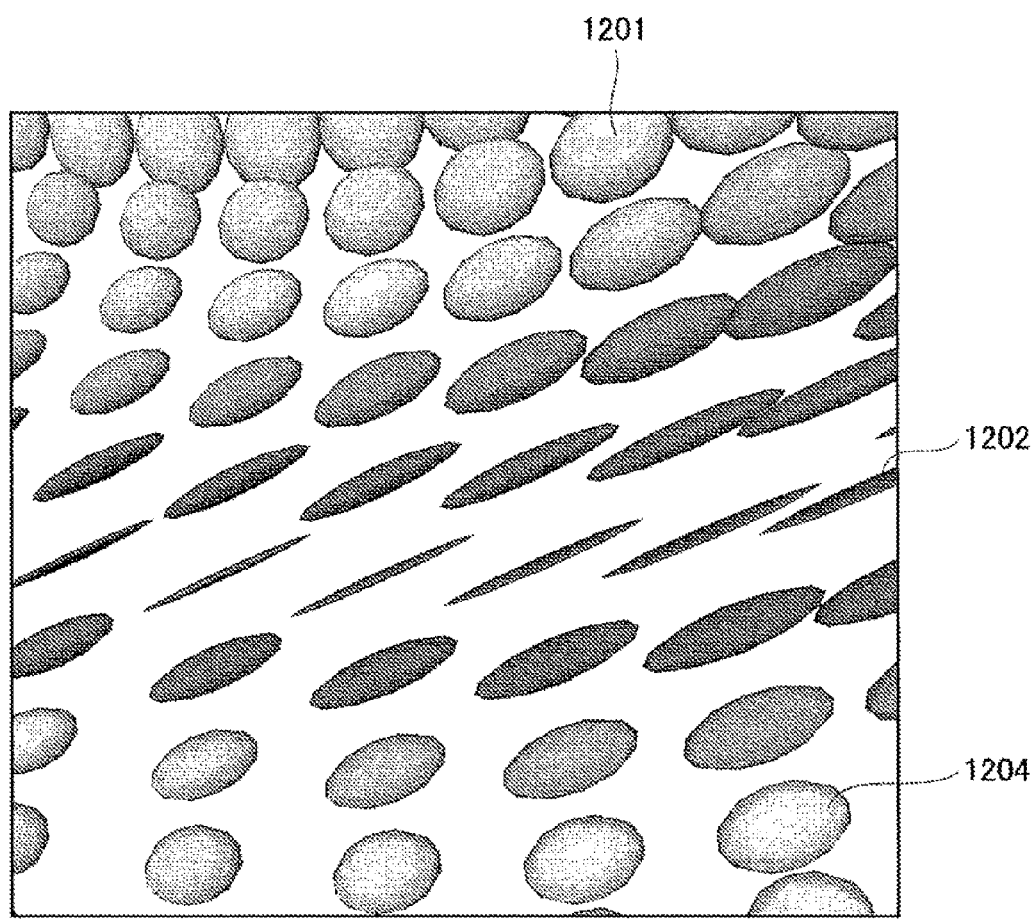
FIG. 13 is a diagram illustrating an example of applying the color map to tensor data.

FIG. 13 is a diagram illustrating an example of applying the color map to tensor data. Examples of the tensor data (or tensor values) include spatial data output from the MRI, for example. In general, the tensor data may be visualized by a glyph or icon. The tensor data D may be defined for each discrete point in space as follows.

$$D = \begin{pmatrix} D_{xx} & D_{xy} & D_{xz} \\ D_{yx} & D_{yy} & D_{yz} \\ D_{zx} & D_{zy} & D_{zz} \end{pmatrix}$$

An Eigenvalue $\lambda$ and an Eigenvector e may be defined as follows with respect to the tensor quantity.

$$De_i = \lambda_i e_i$$

The shape representation called the glyph may be realized by three coefficients obtained from the Eigenvalue and three Eigenvectors.

First, in a case in which a reference glyph has a square shape, the three coefficients described above may be used for a ratio of the vertical length, horizontal width, and height of the glyph. Next, a three-dimensional rotation of the glyph may be determined by the Eigenvectors. A color scheme may depend on the target. For example, the Eigenvalues or the Eigenvectors may be selected, and the color map may be defined by realizing the color scheme according to the magnitudes of the selected values or vectors. Alternatively, instead of using the color map, the mapping for the coloring may use a monochrome gradation map, such as a gray scale and the like.

Similarly as in the case of the vector representation using the parasol-shaped polygons as arrows, a representative point (for example, a center of gravity) of the glyph and the position of the representative point may be determined. By performing the process of interpolating the physical values of the lattice points of the structural lattice on the visualization plane and the subsequent processes described above, the automatic adjustment of the color map may be performed. In the example illustrated in FIG. 13, the coloring may be performed by mapping different colors to the glyph-shapes 1201, 1202, and 1204.

Figure 14B:
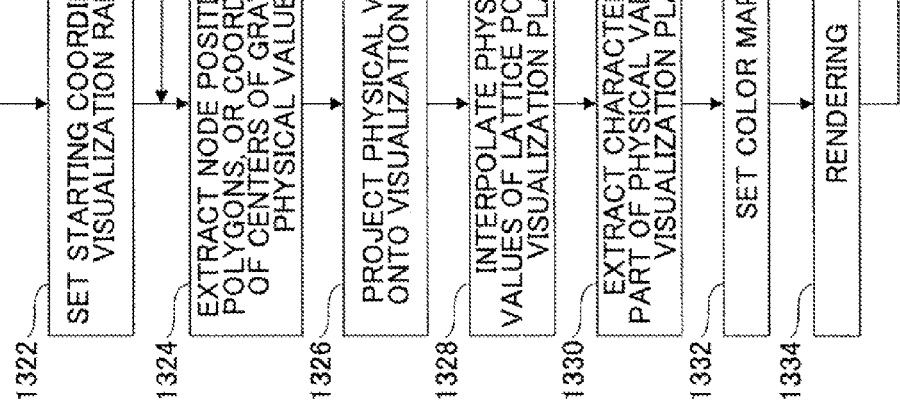
FIGS. 14A and 14B are flow charts for explaining examples of processes of the visualization apparatus in an embodiment.
Figure 14A:
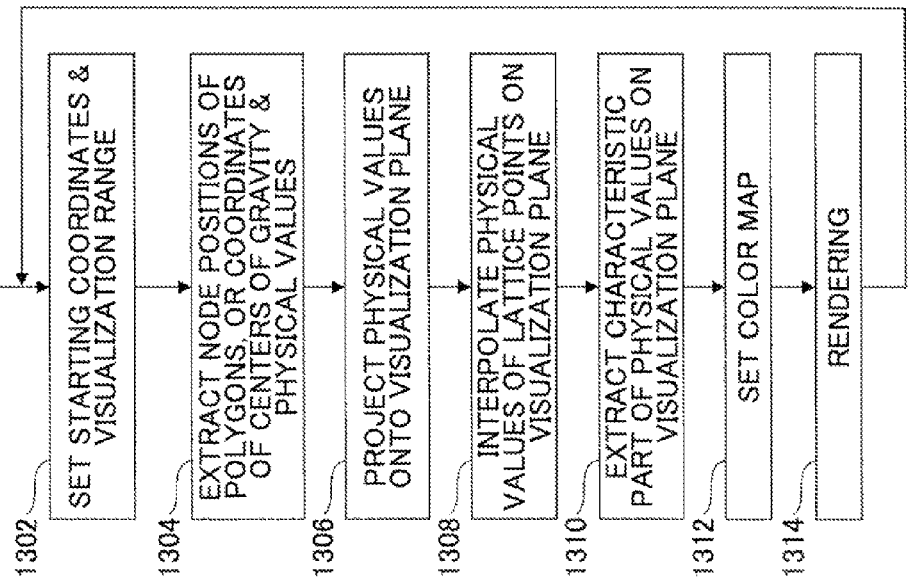

FIGS. 14A and 14B are flow charts for explaining examples of processes of the visualization apparatus in an embodiment.

FIG. 14A illustrates the process with respect to a static model that does not change with time. For the sake of convenience, it is a precondition in FIG. 14A that the entire model, that is the display target, is already subjected to the rendering.

In a step 1302 in FIG. 14A, the user sets the starting coordinates and the visualization range. In a step 1304, the node positions of the polygons, or the coordinates of the centers of gravity and the physical values are extracted. In a step 1306, the physical values are projected onto the visualization plane. In a step 1308, the physical values of the lattice points on the visualization plane are interpolated. In a step 1310, the characteristic part of the physical values on the visualization plane are extracted. More particularly, in the step 1310, the second order differential of the physical values are obtained in order to designate the inflection point curve, as the characteristic part (or feature) of the physical values. When the inflection point curve is not found, the position and direction of the vector having a large gradient, the maximum value and the minimum value of the physical values, and the like may be designated. In a step 1312, the color map is set based on the designated characteristic part (or feature). In a step 1314, the rending is performed using the set color map.

The image may be displayed by the process of FIG. 14A described above. When changing the starting coordinates, the visualization range, and the like, the process may return to the step 1302 after the step 1314.

FIG. 14B illustrates the process with respect to a dynamic model that changes dynamically with time. For the sake of convenience, it is a precondition in FIG. 14B that the entire model, that is the display target, is already subjected to the rendering.

In a step 1322 in FIG. 14B, the user sets the starting coordinates and the visualization range. In a step 1324, the node positions of the polygons, or the coordinates of the centers of gravity and the physical values are extracted. In a step 1326, the physical values are projected onto the visualization plane. In a step 1328, the physical values of the lattice points on the visualization plane are interpolated. In a step 1330, the characteristic part of the physical values on the visualization plane are extracted. More particularly, in the step 1330, the second order differential of the physical values are obtained in order to designate the inflection point curve, as the characteristic part (or feature) of the physical values. When the inflection point curve is not found, the position and direction of the vector having a large gradient, the maximum value and the minimum value of the physical values, and the like may be designated. In a step 1332, the color map is set based on the designated characteristic part (or feature). In a step 1334, the rending is performed using the set color map.

The process of the steps 1322 through 1334 is similar to that illustrated in FIG. 14A, however, the model changes dynamically with time for the process illustrated in FIG. 14B. Hence, in a step 1336, the data on the visualization plane are stored, and the process returns to the step 1324.

Although the color map is set each time according to the process illustrated in FIG. 14B, the color map may be fixed the first time the process is performed. When the change of the target with time is to be observed, the changing part may be recognized more easily when the color map is fixed. In some cases, a new inflection point curve may be generated, or an existing inflection line may disappear or cease to exist, during visualization process. In such cases, the color map may be reset. Alternatively, the resetting of the color map may be performed at an appropriate time or when preferable, based on an instruction input by the user. As described above, instead of using the color map, the mapping for the coloring may use a monochrome gradation map, such as a gray scale and the like.

Figure 15:
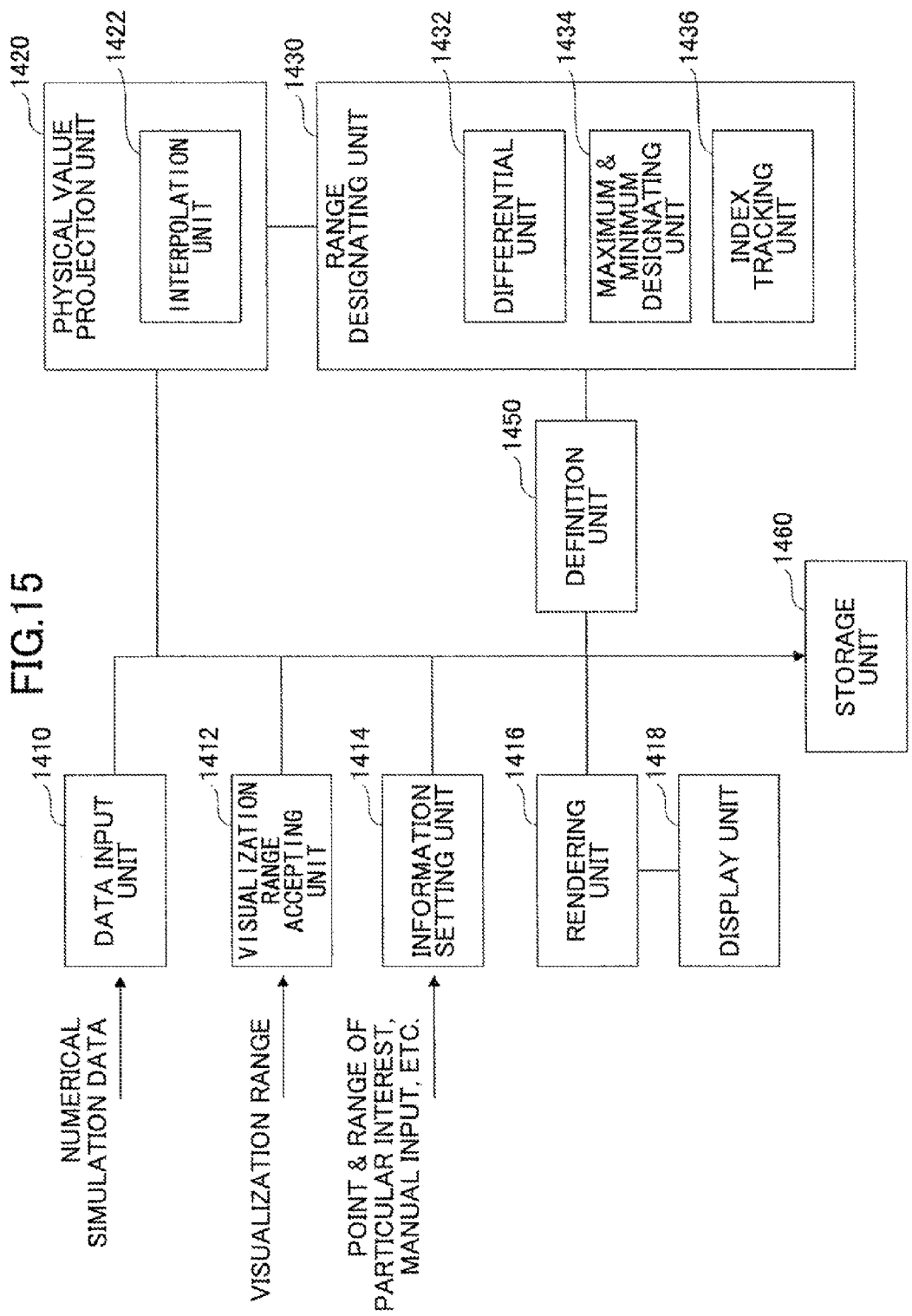
FIG. 15 is a block diagram illustrating an example of a functional structure of the visualization apparatus in an embodiment.

FIG. 15 is a block diagram illustrating an example of a functional structure of the visualization apparatus in an embodiment.

In FIG. 15, a data input unit 1410 may input the data, such as the numerical simulation data, the MRI measurement data, and the like, and store the input data in a storage unit 1460. A visualization range accepting unit 1412 may accept input of an instruction from the user indicating the visualization range of interest to the user. An information setting unit 1414 may accept input of a point and a range of particular interest to the user within the visualization range, a manual input of a instruction to reset the color map, and the like, when preferred.

A physical value projection unit 1420 may perform the process of projecting the physical values onto the visualization plane. An interpolation unit 1422 may perform the interpolation process on the projected physical values to interpolate the physical values to the positions of each of the lattice points on the visualization plane.

A range designating unit 1430 may designate the characteristic part (or feature) of the physical values, and designate the range of the physical values to be emphasized. A differential unit 1432 may obtain a second order differential of the physical values on the visualization plane, and designate the inflection point curve. An index tracking unit 1436 may add the index to the inflection point curve, and track the index of the dynamically changing target. The index tracking unit 1436 may also manage the appearance of a new index, a disappearance of an existing index, and the like.

A maximum and minimum designating unit 1434 may designate the maximum value and the minimum value of the physical values. The maximum and minimum designating unit 1434 may also designate the position where the gradient of the physical values becomes the maximum and the direction of the gradient. A definition unit 1450 may define the color map from the recognized characteristic part (or feature) of the physical values. The definition unit 1450 may, instead of defining the color map, define a monochrome gradation map, such as a gray scale and the like.

A rendering unit 1416 may perform the rendering of the image on the visualization plane, based on the defined color map, in order to perform the coloring. The rendering unit 1416 may also perform the rendering of the image for the entire model. A display unit 1418 may display the image obtained by the rendering.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A visualization apparatus comprising:
   a processor configured to visualize a visualization range of a three-dimensional model, based on physical values of a plurality of regions of the model, wherein the processor performs a visualization process including
      setting the visualization range;
      projecting the physical values of the plurality of regions of the model corresponding to the visualization range onto a visualization plane that is to be displayed;
      designating a coloring range for the physical values of the plurality of regions of the model projected onto the visualization plane, within the visualization range, based on the physical values;
      defining a color map that determines a mapping of colors corresponding to the physical values, based on the coloring range of the physical values; and
      rendering the visualization range on the visualization plane, based on the color map and the coloring range, in order to map the colors onto the plurality of regions of the model corresponding to the visualization range,
   wherein the designating designates, as the coloring range, a range that connects inflection points where a second order differential of the physical values of the plurality of regions of the model projected onto the visualization plane becomes zero,
   wherein the defining defines the color map based on features or positions of an inflection point curve connecting the inflection points, and
   wherein the rendering includes applying the color map to vector data representing features or positions of the physical values on the visualization plane, in order to display a plurality of vectors respectively having a length from a starting position and projected onto the visualization plane, with respect to the plurality of regions of the model corresponding to the visualization range.

2. The visualization apparatus as claimed in claim 1, wherein the designating designates, as the coloring range, a range including a maximum value and a minimum value of the physical values on the visualization plane.

3. The visualization apparatus as claimed in claim 1, wherein, when no physical value is allocated to a certain lattice point of one of the plurality of regions of the model, the projecting computes interpolated values from physical values allocated to lattice points neighboring the certain lattice point and allocates the interpolated values to the certain lattice point as the physical values thereof.

4. The visualization apparatus as claimed in claim 1, wherein the applying displays the plurality of vectors with a representation including at least one of arrows and parasol-shaped polygons.

5. The visualization apparatus as claimed in claim 1,
   wherein the setting, the projecting, the designating, the defining, and the rendering are repeated for each visualization range in a case in which the model is formed by a static model that does not change with time, and
   wherein data on the visualization plane after the rendering are stored in a storage before the projecting, the designating, the defining, and the rendering are repeated in a case in which the model is formed by a dynamic model that changes dynamically with time.

6. The visualization apparatus as claimed in claim 1,
   wherein the defining defines the color map indicating a physical value versus color characteristic in which the physical values within a first range M1 have a first gradient, the physical values within a second range M2 have a second gradient smaller than the first gradient, and the physical values within a third range M3 have a third gradient larger than the second gradient,
   wherein the physical values within the second range M2 are larger than the physical values within the first range M1, and the physical values within the third range M3 are larger than the physical values within the second range M2, wherein a number of colors allocated to the second range M2 is larger than a number of colors allocated to each of the first and third ranges M1 and M3, and wherein a position where the gradient of the physical values becomes a maximum value and a direction of the gradient are designated, and the rendering maps the colors in the second range M2, in between the maximum value and a minimum value of the physical values along the designated direction.

7. A visualization method to be implemented by a computer, comprising:

visualizing, by the computer, a visualization range of a three-dimensional model, based on physical values of a plurality of regions of the model, wherein the visualizing includes setting the visualization range;

projecting the physical values of the plurality of regions of the model corresponding to the visualization range onto a visualization plane that is to be displayed;

designating a coloring range for the physical values of the plurality of regions of the model projected onto the visualization plane, within the visualization range, based on the physical values;

defining a color map that determines a mapping of colors corresponding to the physical values, based on the coloring range of the physical values; and rendering the visualization range on the visualization plane, based on the color map and the coloring range, in order to map the colors onto the plurality of regions of the model corresponding to the visualization range, wherein the designating designates, as the coloring range, a range that connects inflection points where a second order differential of the physical values of the plurality of regions of the model projected onto the visualization plane becomes zero, wherein the defining defines the color map based on features or positions of an inflection point curve connecting the inflection points, and wherein the rendering includes applying the color map to vector data representing features or positions of the physical values on the visualization plane, in order to display a plurality of vectors respectively having a length from a starting position and projected onto the visualization plane, with respect to the plurality of regions of the model corresponding to the visualization range.

8. The visualization method as claimed in claim 7, wherein the designating designates, as the coloring range, a range including a maximum value and a minimum value of the physical values on the visualization plane.

9. The visualization method as claimed in claim 7, wherein, when no physical value is allocated to a certain lattice point of one of the plurality of regions of the model, the projecting computes interpolated values from physical values allocated to lattice points neighboring the certain lattice point and allocates the interpolated values to the certain lattice point as the physical values thereof.

10. The visualization method as claimed in claim 7, wherein the applying displays the plurality of vectors with a representation including at least one of arrows and parasol-shaped polygons.

11. The visualization method as claimed in claim 7, wherein the defining defines the color map indicating a physical value versus color characteristic in which the physical values within a first range M1 have a first gradient, the physical values within a second range M2 have a second gradient smaller than the first gradient, and the physical values within a third range M3 have a third gradient larger than the second gradient, wherein the physical values within the second range M2 are larger than the physical values within the first range M1, and the physical values within the third range M3 are larger than the physical values within the second range M2, wherein a number of colors allocated to the second range M2 is larger than a number of colors allocated to each of the first and third ranges M1 and M3, and wherein a position where the gradient of the physical values becomes a maximum value and a direction of the gradient are designated, and the rendering maps the colors in the second range M2, in between the maximum value and a minimum value of the physical values along the designated direction.

12. The visualization method as claimed in claim 7, wherein the setting, the projecting, the designating, the defining, and the rendering are repeated for each visualization range in a case in which the model is formed by a static model that does not change with time, and wherein data on the visualization plane after the rendering are stored in a storage before the projecting, the designating, the defining, and the rendering are repeated in a case in which the model is formed by a dynamic model that changes dynamically with time.

13. A non-transitory computer-readable storage medium having stored therein a program for causing a computer to execute a visualization process comprising:

visualizing a visualization range of a three-dimensional model, based on physical values of a plurality of regions of the model, wherein the visualizing includes setting the visualization range;

projecting the physical values of the plurality of regions of the model corresponding to the visualization range onto a visualization plane that is to be displayed;

designating a coloring range for the physical values of the plurality of regions of the model projected onto the visualization plane, within the visualization range, based on the physical values;

defining a color map that determines a mapping of colors corresponding to the physical values, based on the coloring range of the physical values; and rendering the visualization range on the visualization plane, based on the color map and the coloring range, in order to map the colors onto the plurality of regions of the model corresponding to the visualization range, wherein the designating designates, as the coloring range, a range that connects inflection points where a second order differential of the physical values of the plurality of regions of the model projected onto the visualization plane becomes zero, wherein the defining defines the color map based on features or positions of an inflection point curve connecting the inflection points, and wherein the rendering includes applying the color map to vector data representing features or positions of the physical values on the visualization plane, in order to display a plurality of vectors respectively having a length from a starting position and projected onto the visualization plane, with respect to the plurality of regions of the model corresponding to the visualization range.

14. The non-transitory computer-readable storage medium as claimed in claim 13, wherein the designating designates, as the coloring range, a range including a maximum value and a minimum value of the physical values on the visualization plane.

15. The non-transitory computer-readable storage medium as claimed in claim 13, wherein, when no physical value is allocated to a certain lattice point of one of the plurality of regions of the model, the projecting computes interpolated values from physical values allocated to lattice points neighboring the certain lattice point and allocates the interpolated values to the certain lattice point as the physical values thereof.

16. The non-transitory computer-readable storage medium as claimed in claim 13, wherein the applying displays the plurality of vectors with a representation including at least one of arrows and parasol-shaped polygons.

17. The non-transitory computer-readable storage medium as claimed in claim 13,
- wherein the setting, the projecting, the designating, the defining, and the rendering are repeated for each visualization range in a case in which the model is formed by a static model that does not change with time, and
- wherein data on the visualization plane after the rendering are stored in a storage before the projecting, the designating, the defining, and the rendering are repeated in a case in which the model is formed by a dynamic model that changes dynamically with time.

18. The non-transitory computer-readable storage medium as claimed in claim 13, wherein
- wherein the defining defines the color map indicating a physical value versus color characteristic in which the physical values within a first range M1 have a first gradient, the physical values within a second range M2 have a second gradient smaller than the first gradient, and the physical values within a third range M3 have a third gradient larger than the second gradient,
- wherein the physical values within the second range M2 are larger than the physical values within the first range M1, and the physical values within the third range M3 are larger than the physical values within the second range M2,
- wherein a number of colors allocated to the second range M2 is larger than a number of colors allocated to each of the first and third ranges M1 and M3, and
- wherein a position where the gradient of the physical values becomes a maximum value and a direction of the gradient are designated, and the rendering maps the colors in the second range M2, in between the maximum value and a minimum value of the physical values along the designated direction.

\* \* \* \* \*